United States Patent [19]
Groot et al.

[11] 4,092,143
[45] May 30, 1978

[54] TUNNEL FURNACE FOR THE THERMAL TREATMENT OF GLASS PRODUCTS

[75] Inventors: Theodorus Cornelis Groot, Eindhoven; Arie Cornelis Vliegenthart, Aalst, both of Netherlands

[73] Assignee: U.S. Philips Corporation, New York, N.Y.

[21] Appl. No.: 766,145

[22] Filed: Feb. 7, 1977

Related U.S. Application Data

[63] Continuation of Ser. No. 616,135, Sep. 23, 1975, abandoned.

[30] Foreign Application Priority Data

Sep. 24, 1974 Netherlands .................. 7412568

[51] Int. Cl.² .............................................. C03B 25/04
[52] U.S. Cl. .................................. 65/351; 65/350; 65/119
[58] Field of Search ................. 65/117, 119, 348, 349, 65/350, 351

[56] References Cited

U.S. PATENT DOCUMENTS 1,896,874  2/1933  Wadman ........................ 65/348 X
3,884,667  5/1975  Schraven et al. ................. 65/351 X Primary Examiner—Arthur D. Kellogg
Attorney, Agent, or Firm—Frank R. Trifari; Robert S. Smith

[57] ABSTRACT

A method of thermally treating glass products in which the products are conveyed through a number of heating zones and/or cooling zones of a tunnel furnace and are heated and cooled, respectively, by means of an airflow maintained in each zone in a direction transverse to the direction of transport; according the invention, the velocity of the airflow increases gradually both in the heating zones and in the cooling zones; for that purpose, two perforated partitions having gradually increasing flow apertures for the airflow are provided in each zone.

1 Claim, 4 Drawing Figures

TUNNEL FURNACE FOR THE THERMAL TREATMENT OF GLASS PRODUCTS

This is a continuation of application Ser. No. 616,135, filed Sept. 23, 1975, now abandoned. The invention relates to a method for the thermal treatment of glass products, in particular envelopes for display tubes in which the products are conveyed through a tunnel furnace which is divided into zones and are exposed in the successive zones to the action of a temperature-controlled air flow which is maintained throughout the length of each zone in a direction transverse to the direction of transport of the products, the air flows in the individual zones being controllable independently of each other. Such methods are used for removing glass stresses in glass products.

In such a method which is known from the British patent specification No. 701,095, a previously determined temperature variation from the inlet end to the outlet end of the tunnel furnace can be maintained due to the independent control of the air temperature in each zone. Since, however, the temperature of the air flows varies stepwise from zone to zone and since the velocity of the air flow within one and the same zone and hence the coefficient of heat transfer in this zone is constant, the products are subjected to a stepwise temperature variation from zone to zone. Said stepwise temperature variations result in considerable, undesired temperature differences between the inside and the outside of the products.

These drawbacks could be avoided partly by short stays of the products in the individual zones and/or by a low coefficient of heat transfer, that is to say low velocities of the air flows. However, short stays require an expensive furnace having a comparatively large number of zones; a low coefficient of heat transfer has the drawback that large temperature differences across the surface occur in products having large differences in wall thickness, as a result of which extra stresses occur in the product.

It is the object of the invention to provide a method which does not exhibit the said drawbacks and which enables the products to be treated to be subjected to a gradually occurring temperature variation during their transport through the tunnel furnace.

According to the invention, this object is achieved mainly in that, viewed in the direction of transport, the air flow in each zone has a continuously variable velocity.

Since the velocity of the air flow in a given zone is variable, the coefficient of heat transfer in said zone also varies. Since the coefficient of heat transfer is variable, temperature variations of the products within the same zone take place gradually.

The measure according to the invention may be used both for heating glass products and for cooling because with these treatments extra stresses are apt to occur in the products.

A preferred embodiment of the method according to the invention is characterized by such a distribution of the velocity of the air flow that temperature variations of the products occur at a constant rate. By a suitable choice of the velocity of the air flow within the same zone, the coefficient of heat transfer can be varied so that a linearly varying temperature gradient is maintained in said zone, temperature variations of the products taking place throughout the length of the zone at a constant rate.

In another preferred embodiment of the method according to the invention the velocity of the air flow increases gradually in each zone. As a result of this measure a gradually increasing coefficient of heat transfer and a gradual temperature increase or temperature decrease of the products are realized within each zone of the heating track and/or the cooling track of the tunnel furnace.

The invention also relates to a tunnel furnace for carrying out the method and comprising a transport apparatus for the transport of products through the tunnel from an inlet side to an outlet side, said tunnel furnace being divided into zones, each zone comprising means for generating an air flow in a direction transverse to the longitudinal direction of the tunnel, and means for controlling the air temperature; according to the invention said tunnel furnace is characterized in that a partition having flow apertures is provided in each zone on two oppositely located sides of the tunnel, the cross-section of the flow apertures, viewed in the direction of the outlet side, increasing. As a result of this measure, an air flow having a velocity which is continuously variable in the direction of transport can be generated in a very simple manner in each zone and a gradual temperature variation of the products can be realized in a simple manner at a constant rate.

The tunnel furnace may be constructed as a cooling furnace having only a cooling section for the controlled cooling of blown or moulded glass products which are still hot. Such tunnel furnaces usually comprise both a heating section and a cooling section, already cooled glass products being first heated and then cooled again. In special cases such a tunnel furnace may be constructed only as a heating furnace.

The invention will be described in greater detail with reference to the drawing. In the drawing.

Figure 1:
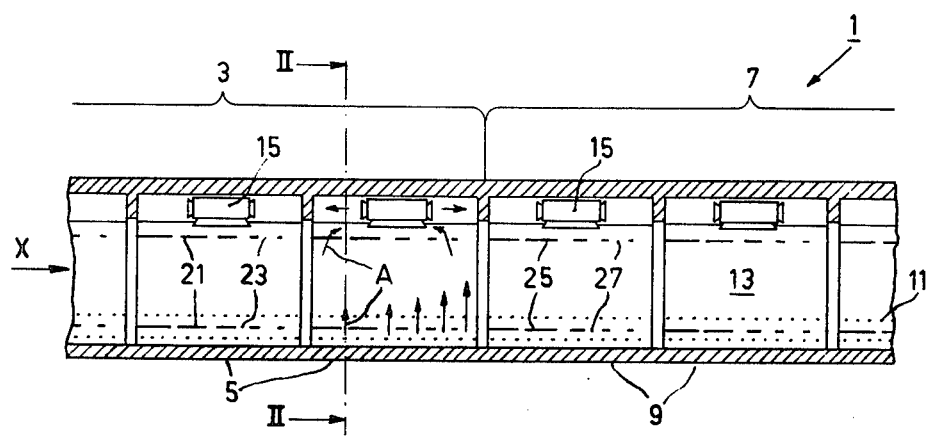
FIG. 1 is a longitudinal sectional view of an embodiment of the tunnel furnace according to the invention taken on the line I—I of FIG. 2.
Figure 2:
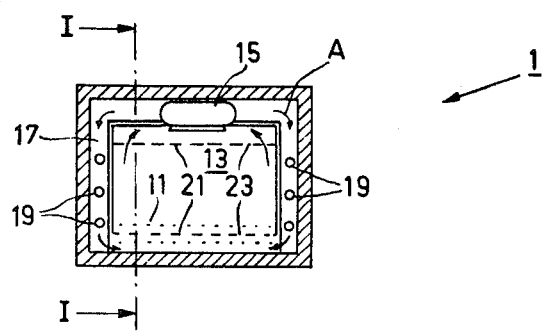
FIG. 2 is a cross-sectional view of the tunnel furnace taken on the line II—II of FIG. 1.

The tunnel furnace 1 shown in FIGS. 1 and 2 comprises a heating section 3 which is subdivided into heating zones 5, and a cooling section 7 which is divided into cooling zones 9. A transport device, in the embodiment shown an endless transport belt 11 of metal grating work, serves for the transport of glass products to be treated thermally through the tunnel 13 of the furnace in the direction denoted by the arrow X from the inlet side to the outlet side of the furnace. The zones 5 and 9 each comprise a fan 15, a recirculation duct 17, and a number of controllable heating elements 19. A partition 21 having flow apertures 23 is provided in each heating zone on the lower side and on the upper side of the tunnel 13. Partitions 25 having flow apertures 27 are provided in a corresponding manner in the cooling zones 9.

By means of the fan 15, an airflow A is maintained in each zone 5 and 9, in a direction transverse to the direction of transport of the products, vertically upwards through the flow apertures 23 and 27 of the partitions 21 and 25 and through the transport belt 11. Via the recirculation duct 17, said air is conveyed back to the lower side of the zones. The air, during its flow through the recirculation duct 17, is heated again at the desired temperature by means of the controllable heating elements 19. The air temperature is individually controllable in each zone independently of the temperature control in the other zones. As is shown in the drawing, the cross-section of the flow aperture 23 in the partitions 21 which are placed in the heating zones 5, gradually increases viewed in the direction of transport X. As a result of this the velocity of the air flow between the two partitions, viewed in the direction of transport X, also increases as a result of which the coefficient of heat transfer becomes larger in the direction of transport. By a suitable choice of the cross-section of the flow apertures 21, the variation of the coefficient of heat transfer can be adapted to the thickness of the glass products to be treated in such manner that a constant heating rate of the product is obtained.

A gradual cooling of the product is obtained in a similar manner in the zones 9 of the cooling section 7 in that the velocity of the air flow as well as the coefficient of heat transfer, viewed in the direction of transport, gradually increases in each zone. For that purpose, the flow apertures 27 in the partitions 25 which are placed in the cooling zones 9 are also proportioned so that their cross-section, viewed in the direction of transport, increases gradually.

In the embodiment the partitions 21 and 25, respectively, are provided on the lower side and on the upper side of each zone. In a similar, although less favourable, manner, the partitions 21 and 25, respectively, could be arranged on either side of the tunnel 13.

Figure 3:
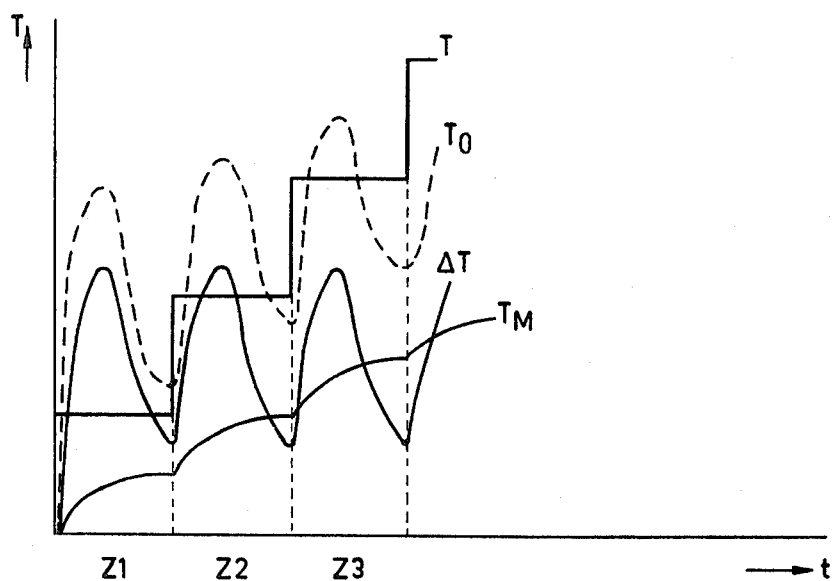
FIGS. 3 and 4 show time-temperature graphs.
Figure 4:
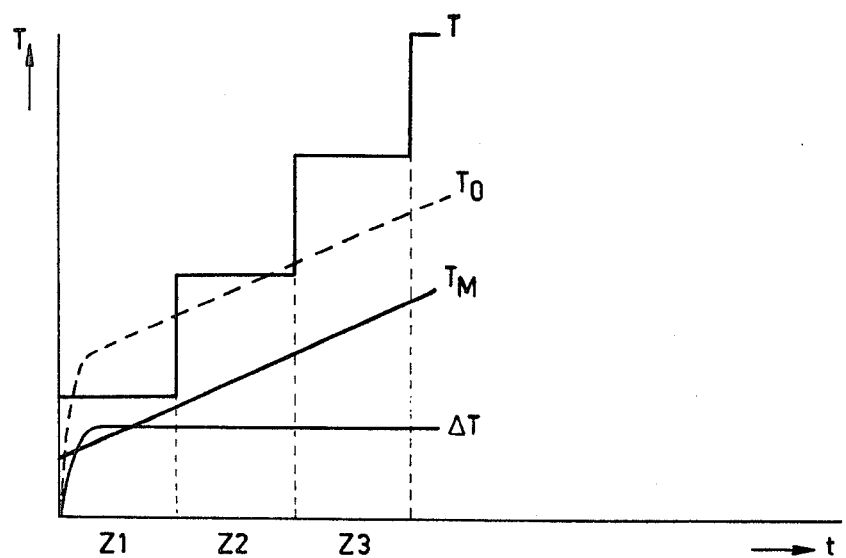

The graphs shown in FIGS. 3 and 4 clearly show the advantages obtained by means of the method according to the invention. In these graphs, T is the air temperature, To is the surface temperature of the glass products to be treated, $T_M$ is the average temperature of the producs and $\Delta T$ is the difference between the surface temperature To and the average temperature $T_M$ of the glass products during traversing successive heating zones Z1, Z2 and Z3.

FIG. 3 shows the temperature variation if the glass products are treated according to the known method; from this is appears that the surface temperature To as well as the temperature difference $\Delta T$ of the glass products fluctuates considerably both within the same zone and between successive zones, which means that large temperature differences occur between the inside and the outside of the products.

FIG. 4 shows the situation if the products are treated with the method according to the invention. Both the surface temperature To and the average temperature $T_M$ vary linearly, as a result of a constant heating rate, the temperature difference $\Delta T$ reaching a constant value in a comparatively short period of time.

In the cooling zone, the cooling of the products occurs in a similar manner with a gradually decreasing temperature variation and with a stabilised temperature difference.

What is claimed is:

1. A tunnel furnace for the thermal treatment of an associated article which comprises: a housing defining a tunnel which includes a plurality of zones, each zone having an inlet and an outlet for the associated article, the inlet for the associated article for each zone after the first zone being the outlet of the preceding zone, a transport apparatus for the transport of the associated articles in a longitudinal direction through said tunnel from an inlet side to an outlet side of each successive zone, each zone extending over longitudinal section of said tunnel, means for generating an airflow in a direction transverse to the longitudinal direction of the tunnel with each zone and means for controlling the temperature of the airflow in each zone, said housing including first and second walls having therein flow apertures, said first and second walls in any one zone being disposed in opposed relationship, each of said walls being disposed in generally parallel relationship to said longitudinal direction, the total area of the flow apertures on opposed sides of any one zone being equal, the area of the flow apertures in each zone being inversely related to the longitudinal distance from said outlet of said zone.

* * * * *